United States Patent [19]

Fujii

[11] Patent Number: 4,764,794
[45] Date of Patent: Aug. 16, 1988

[54] ORIGINAL FILM DISCHARGE MECHANISM IN AN INCLINED-TYPE EXPOSING APPARATUS

[75] Inventor: Koichi Fujii, Uji, Japan

[73] Assignee: Dainippon Screen Mfg. Co., Ltd., Kyoto, Japan

[21] Appl. No.: 96,497

[22] Filed: Sep. 15, 1987

[30] Foreign Application Priority Data

Sep. 16, 1986 [JP] Japan ............................ 61-142315[U]

[51] Int. Cl.$^4$ ............................................. G03B 27/20
[52] U.S. Cl. ......................................... 355/87; 355/91
[58] Field of Search ........................ 355/86, 87, 91, 94, 355/95, 99, 114, 127

[56] References Cited

U.S. PATENT DOCUMENTS

| | | | |
|---|---|---|---|
| 3,126,807 | 3/1964 | Bragg et al. | 355/87 |
| 3,503,679 | 3/1970 | Kawarabayashi et al. | 355/87 X |
| 3,689,153 | 9/1972 | Suzuki | 355/91 X |
| 4,351,610 | 9/1982 | Skrypek et al. | 355/86 |
| 4,353,647 | 10/1982 | Harrell et al. | 355/91 X |
| 4,575,233 | 3/1986 | Copeland et al. | 355/91 X |
| 4,664,510 | 5/1987 | Weag | 355/86 |
| 4,708,467 | 11/1987 | Raith | 355/87 X |
| 4,714,947 | 12/1987 | Nishida et al. | 355/87 X |

FOREIGN PATENT DOCUMENTS 58-143333  8/1983  Japan .

Primary Examiner—Richard A. Wintercorn
Attorney, Agent, or Firm—Lowe, Price, Leblanc, Becker & Shur

[57] ABSTRACT

In an original film discharge mechanism in an inclined-type step and repeat machine that includes a photosensitive material holder having a rearwardly inclined surface for holding thereon a photosensitive material and an original film holder movable along the surface of the material holder, which mechanism includes a discharge part having a surface rearwardly inclined at substantially the same angle as that of the surface of the material holder with respect to the horizontal for receiving thereon the original film discharged from the film holder, and a supporting member for supporting the original film removed from the film holder, the improvement includes suctions provided on the surface of the discharge part for suction-holding the original film being discharged onto the part from the film holder, the suctions being positioned upward of and remote from the supporting member along the surface of the discharge part at a distance larger than longitudinal size of the original film; the film holder and suctions being adapted for relative movement away from each other while the latter suction-holding the film to thereby release the film from the film holder; and whereby the original film so released is permitted to be supported at a lower end thereof by the supporting member after the suctions stops so suction-holding.

3 Claims, 3 Drawing Sheets

ORIGINAL FILM DISCHARGE MECHANISM IN AN INCLINED-TYPE EXPOSING APPARATUS

FIELD OF THE INVENTION AND RELATED ART STATEMENT

The present invention relates to an inclined-type exposing apparatus such as an inclined-type step and repeat machine for use in graphic arts processes, and more particularly to an original film discharge mechanism for automatically discharging onto a discharge part thereof original films through whose images photosensitive materials have been exposed to light. (The term "original film" is defined as meaning not only the original film per se but also the type assembled of a base film and the original film adhered thereto in this specification.)

Heretofore, according to the conventional step and repeat machine, an original film holder having a glass plate on whose lower surface is suction-held an original film is moved to a desired position above a photosensitive material that is set on a holder therefor in the first place. Secondly, after the original film so duly positioned and the photosensitive material are brought into direct contact with each other by applying vacuum-suction thereto, exposing of the photosensitive material through the original film is performed. Such exposing is repeated every time the original film holder is moved to other desired positions and stopped thereat, until desired printing of the original film that is suction-held by the holder is completed. Thereafter, the film holder is moved to a position at which to confront a discharge part of the machine disposed aside of the photosensitive material holder, so as to discharge onto the discharge part the original film through which the required exposure of the photosensitive material has been made.

Besides, as prior inclined-type step and repeat machine, ones are described in U.S. Pat. No. 4,351,610 and U.S. patent application Ser. No. 028,719.

In discharging the original film onto the above discharge part or any equivalent device, the film being suctions-held by suction grooves that are formed on the film holder is, in the art, removed from the holder by blowing air to the film from the grooves in turn, for example, according to a step and repeat machine described in Japanese Patent Kokai No. 58-143333.

Since, however, the original film and the glass plate of the holder is kept in firm contact with each other by electrostatic force and the like, the film can not be readily released from the plate in its entirety although merely those portions of the film which face the suction grooves are taken off from the plate by receiving the air being blown from the grooves, thus often resulting in a failure to discharge the film onto the discharge part. Such failure will pose a serious problem especially in sequential automatic exposure operations for plural original films.

SUMMARY OF THE INVENTION

With a view to solving the aforementioned problem, it is an objective of the invention to provide a novel and improved original film discharge mechanism in an inclined-type exposing apparatus.

It is another objective of the invention to provide an original film discharge mechanism in an inclined-type exposing apparatus according to which the complete removal of the original film from glass plate of the original film holder is readily attained and further the discharge of the thus released film onto the discharge part is assuredly effected by a simple arrangement and structure thereof.

In order to accomplish the above objectives, according to the invention, there is provided an original film discharge mechanism in an inclined-type exposing apparatus comprising means having a rearwardly inclined surface for holding thereon a photosensitive material and means for holdingly carrying an original film along the surface of the holding means, which mechanism comprises means having a surface rearwardly inclined at substantially the same angle as that of the surface of the holding means with respect to the horizontal for receiving thereon the original film discharged from the carrying means; a supporting member for supporting the original film removed from the carrying means; means provided on the receiving means for suction-holding the original film being discharged onto the receiving means from the carrying means, the suction-holding means being positioned upward of and remote from the supporting member along the surface of the receiving means at a distance larger than longitudinal size of the original film; and the carrying means and suction-holding means being adapted for relative movement in the direction away from each other to release the original film from the carrying means so as to permit the film so released to be supported by the supporting member.

In a preferred embodiment, the original film discharge mechanism further comprises means provided upward of the suction-holding means for blowing gas into that space which is defined between the carrying means and the surface of the receiving means by the relative movement of the carrying means and the suction-holding means away from each other.

Preferably, the suction-holding means comprises a plurality of suctions each capable of forward and rearward dislocations relative to the surface of the receiving means.

Hence, according to the invention, there is readily attained the whole removal of the original film from the carrying means, particularly from the glass plate of the original film holder against electrostatic force etc. acting therebetween, and further there is assuredly enabled the discharge of the original film onto the receiving means therefor such as a discharge part or any equivalent device disposed aside of the photosensitive material holding means by a simple arrangement or structure thereof, which advantages will give benefits especially to the sequential automatic exposure operations for plural original films.

The foregoing and other objectives and attendant advantages of the present invention will be readily appreciated as the same becomes better understood by reference to the following detailed description when considered by accompanying drawings, wherein.

DETAILED DESCRIPTION OF THE PREFERRED EMBODIMENTS

Figure 1:
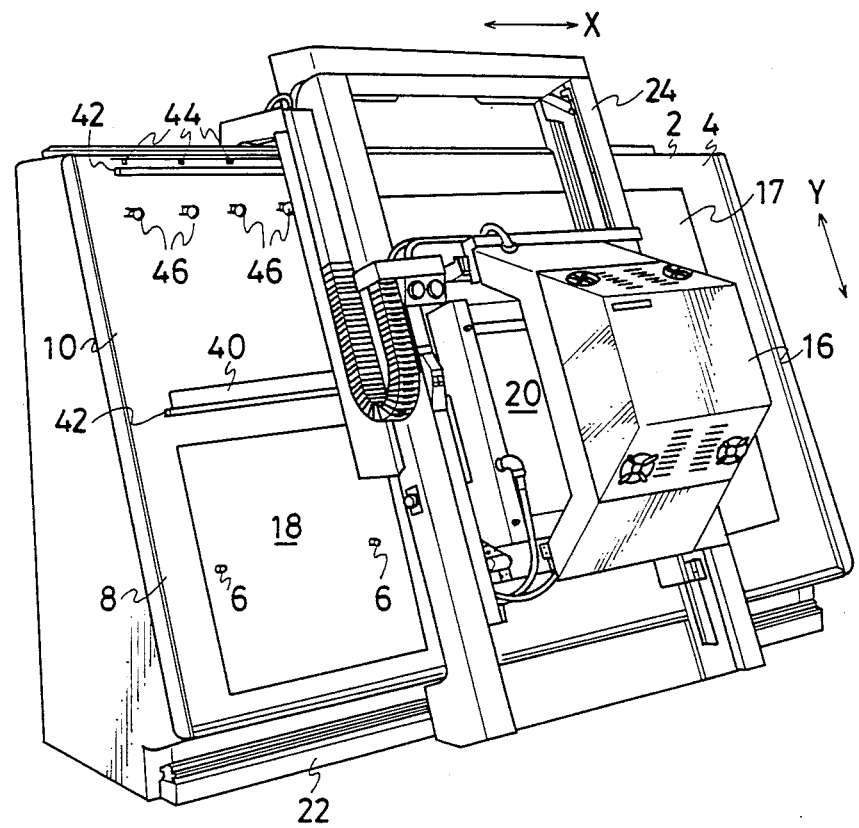
FIG. 1 is a perspective view illustrating a step and repeat machine of the inclined-type which incorporates the original film discharge mechanism according to an embodiment of the invention.

Now referring to the drawings, there are described below preferred embodiments of the invention.

Figure 2:
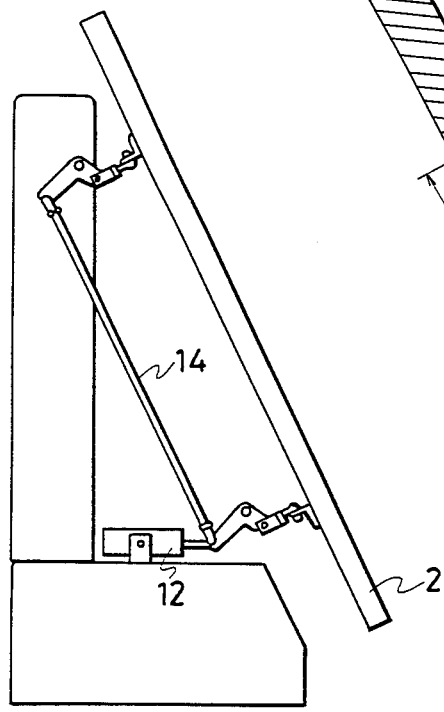
FIG. 2 is a side schematic view depicting an arrangement for moving a table.

FIG. 1 is a perspective view illustrating a step and repeat machine of the inclined type which incorporates the original film discharge mechanism according to an embodiment of the invention, and FIG. 2 is a side schematic view depicting an arrangement for moving a table 2.

The table 2 is constituted by a photosensitive material holder 4, a supply part 8, and a discharge part 10, and is rearwardly inclined at, for example, an angle of 70° or so with respect to the horizontal as shown in FIGS. 1 and 2. A photosensitive material 17 is, being positioned by positioning pins not shown, set on the holder 4. Plural sheets of original films 18 through which the photosensitive material 17 is to be exposed to light are, also being positioned by positioning pins 6, superposingly set on the supply part 8 so as to be supplied to a carrier unit 16. The discharge part 10 receives the original film 18 already undergone the photosensitive material exposing process.

The table 2 is capable of reciprocatory dislocation in a direction orthogonal to the plane of the table 2 by an air cylinder 12 via a link member 14 as illustrated in FIG. 2. The carrier unit 16, in whose inside are mounted a light source not shown and an original film holder 20 to be mentioned below, is movable up and down in Y direction along a moving frame 24, which meanwhile is so designed as to move in X direction transversely of the table 2 while being guided by a rail 22, whereby the unit 16 is capable of moving over the entire surface of the table 2 as desired.

In step and repeat operations, the holder 20 mounted in the carrier unit 16 is properly moved in X and Y directions to a determined position at which to confront the supply part 8. Secondly, after an uppermost sheet of the original film 18 set on the part 8 is suction-held on the lower surface of the holder 20 by means of any vacuum suction member conventionally known to the art, the holder 20 is moved to a desired first exposure position above the photosensitive material 17 set on the holder 4 therefor as stated above. Next, the film 18 and the material 17 are brought into direct contact with each other and then the light source exposes the material 17 through the film 18. Thereafter, the light source repeats the act of exposing every time the holder 20 is moved to other exposure positions above the material 17 and stopped thereat, as desired. Thus, the exposure of the photosensitive material 17 for the one sheet of the original film 18 is completed. Then, the holder 20 is moved properly to a position at which to face the discharge part 10, to discharge the film 18 onto the part 10. Next, after the holder 20 is returned to the position to confront the supply part 8, the same procedures as above are fulfilled for another sheet of original film 18.

Described hereunder is the original film discharge mechanism of the machine.

FIGS. 3 through 6 are partially sectional views explanatorily depicting the discharging operation. Reference numeral 40 designates a film supporting member disposed on the lower portion of the discharge part 10; 42 a pair of members for maintaining a distance between the holder 20 and the part 10; and 44 air nozzles provided on the upper end of the part 10. Furthermore, reference mark 46 denotes suctions which are connected to an air pipe (not shown) of a type, widely known to the art, equipped midway with an electromagnetic valve or the like and accordingly whose film sucking and releasing motions are controlled through on/off actions of the valve. Moreover, by the action of a spring 48 is enabled dislocation of the suction in the direction orthogonal to the plane of the part 10. Usually, the suction 46 is slightly more forwardly projected than the member 42 relative to the plane of the part 10.

Figure 3:
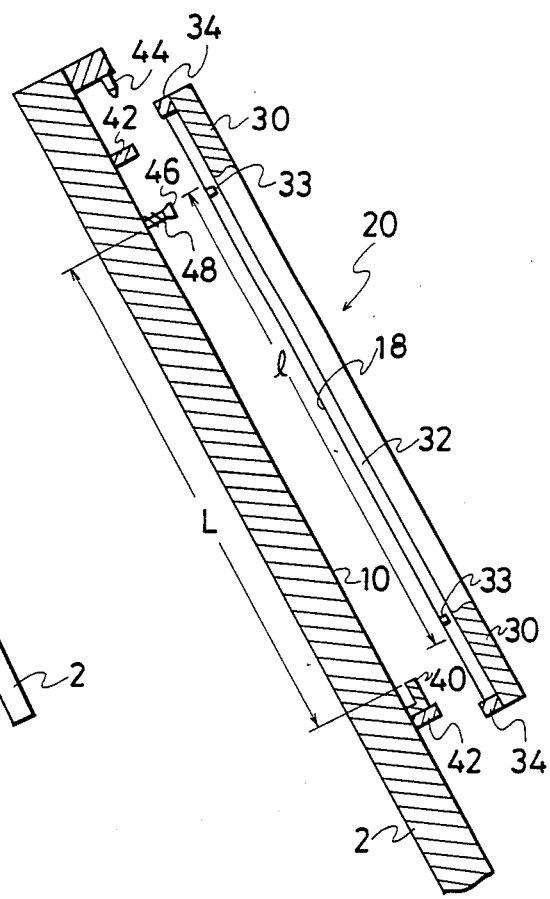
FIGS. 3 through 6 are partially sectional views explanatorily depicting the original film discharging operation of the machine.
Figure 6:
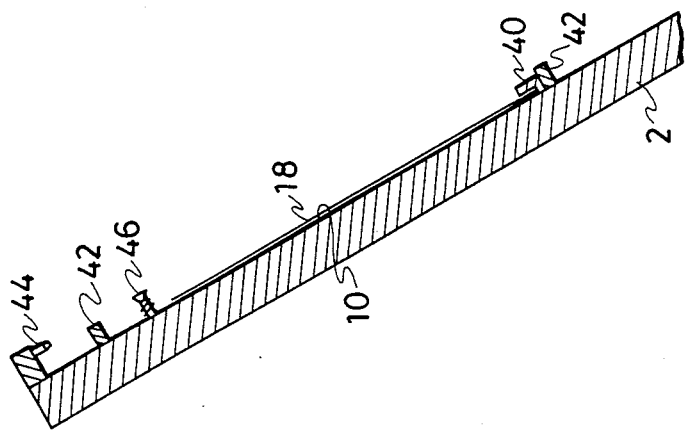

Distance L defined along the surface of the part 10 from the suction 46 to the supporting member 42 for receivingly accumulating the films 18 thereon or therealong is set larger than a longitudinal size l of the film 18 as depicted in FIG. 3. In the event that the original films 18 of different sizes are required to be dealt with, the distance L is necessary to set greater than the film 18 of the largest size, although the films 18 of the same size are commonly employed when the subject exposing is conducted by the step and repeat machine of the type provided with an original film automatic supply/discharge mechanism.

The original film holder 20 is constituted of a frame member 30, a glass plate 32 secured to the lower surface of the member 30, and packings 34 disposed on the periphery of the plate 32 for enabling air-tightness thereof. The plate 32 is formed with suction grooves 33 for suction-holding the film 18.

Described hereunder is the film discharging operation of the above machine.

Figure 4:
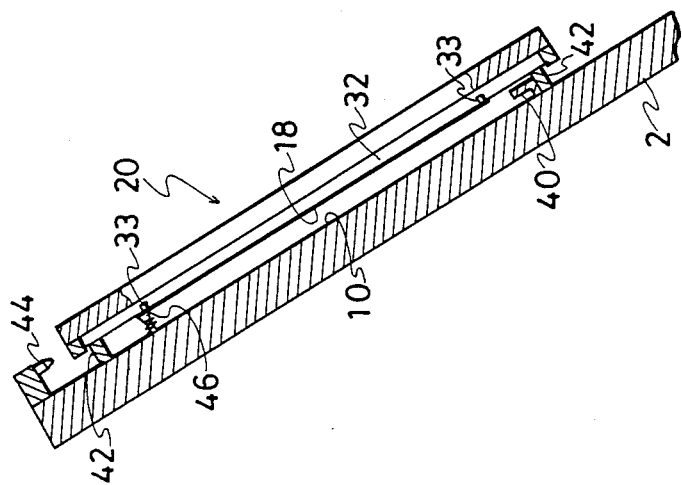

After completion of the required exposures of the photosensitive material 17 through images of the original film 18, the carrier unit 16 is moved in X and Y directions shown in FIG. 1 to the position at which for the holder 20 to just confront the discharge part 10 as shown in FIG. 3. Then, the table 2 is moved toward the holder 20 by the air cylinder 12 so that the member 42 of the part 10 and the glass plate 32 have contact with each other and accordingly the suctions 46 are pushed in the same hight as that of the member 42 relative to the plane of the part 10, as illustrated in FIG. 4. Subsequently, the suctions 46 suction-holds the upper end of the lower side surface of the film 18 and at the same time air is blown to the opposite or obverse side surface of the film 18 from the suction grooves 33, so as to release the film 18 from the holder 20. Ideally, the film 18 should accordingly be removed off the glass plate 32 in order for the lower end of the film 18 to make contact with a surface of the discharge part 10. However, since the film 18 and the glass plate 32 are kept in firm contact with each other by the electrostatic force etc., the removal of the one from the other frequently will not be effected by the mere operation or procedure as stated above.

To attain the complete removal, therefore, the table 2 is subsequently moved away from the holder 20 to the same position as indicated in FIG. 3 by actuating the air cylinder 12 so that the upper end, including an upper portion in its vicinity, of the original film 18 is released from the glass plate 32. Secondly, air is blown into a space defined between the film 18 and the plate 32 from air nozzles 44. As a result the film 18 is wholly released from the plate 32 with the upper end thereof being sucked on the suctions 46, as depicted by an imaginary line in FIG. 5, to make the lower end of the film have contact with the surface of the discharge part 10.

The above air-blowing from the nozzles 44 is not necessarily required to be conducted when the table 2 is designed to be capable of moving away from the holder 20 in the direction perpendicular to the plane of the glass plate 32 to the extent sufficient enough to cause the perfect removal in question.

Figure 5:
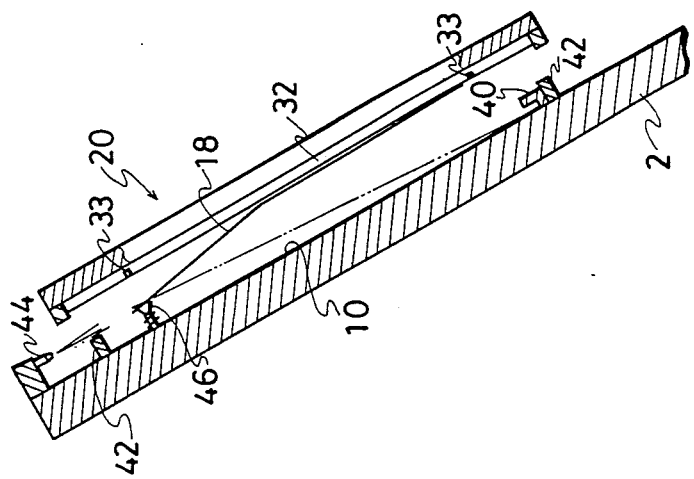

After the subject removal as shown by the imaginary line in FIG. 5 is achieved, the holder 20 is returned to the position to confront the supply part 8 for the purpose of suction-holding on the glass plate 32 another sheet of original film 18 to be dealt with next. Simultaneously, the suctions 46 stops sucking the film 18 just discharged, so that the film 18 slides down along the surface of the part 10 until the lower end thereof reaches the supporting member 40. Consequently, the suctions 46, being no more engaged with the film 18 on suction faces thereof, are ready to cope with the next sheet of the film 18 to be discharged from the holder 20.

Although in the above embodiment the suctions 46 provided on the discharge part 10 serve to suction-hold the original film 18 being discharged onto the part 10 and to allow the film 18 to be slidingly received by the supporting member 40 positioned downward of the suctions by stopping so suction-holding, any other members, insofar as they can fulfill the same function, may be superseded for the suctions 46.

Further, although, in the above embodiment, in suction-holding the upper end portion of the original film 18 the suctions 46 are adapted to be pushed in reduced height relative to the surface of the discharge part 10 as the table 2 moves toward the holder 20 for the surface of the glass plate 32 to push the suctions 46 while the holder is kept stationary, arrangements may be made such that the holder 20 be moved toward and away from the part 10 being stationary on the contrary, or that the suctions 46 per se be moved in the direction orthogonal to the plane of the part 10 by any suitable actuator member such as an air cylinder while both the holder 20 and the part 10 being kept stationary to thereby omit moving mechanism therefor.

While the preferred embodiments of the present invention have been described above, it should be understood that various modifications may be made herein without departing the spirit of the invention and scope of the appended claims.

What is claimed is:

1. In an original film discharge mechanism in an inclined-type exposing appartus comprising means having a rearwardly inclined surface for holding thereon photosensitive material and means for holdingly carrying an original film along said surface of said holding means, said original film discharge mechanism comprising means having a surface rearwardly inclined at substantially the same angle as that of said surface of said holding means with respect to the horizontal for receiving thereon said original film discharged from said carrying means, and a supporting member provided on said receiving means for supporting said original film removed from said carrying means, the improvement comprises:

means provided on said receiving means for suction-holding said original film being discharged onto said receiving means from said carrying means, said suction-holding means being positioned upward of and remote from said supporting member along said surface of said receiving means at a distance larger than longitudinal size of said original film; and said carrying means and suction-holding means being adapted for relative movement in the direction away from each other to release said original film from said carrying means so as to permit said original film so released to be supported by said supporting member.

2. A mechanism as claimed in claim 1, further comprises means provided upward of said suction-holding means for blowing gas into that space which is defined between said carrying means and said surface of said receiving means by said relative movement of said carrying means and said suction-holding means away from each other.

3. A mechanism as claimed in claim 1, wherein said suction-holding means comprises a plurality of suctions each capable of forward and rearward dislocations relative to said surface of said receiving means.

* * * * *